(12) United States Patent
Lee et al.

(10) Patent No.: US 11,350,377 B2
(45) Date of Patent: May 31, 2022

(54) METHOD FOR PERFORMING UPLINK SYNCHRONIZATION IN WIRELESS COMMUNICATION SYSTEM

(71) Applicant: Samsung Electronics Co., Ltd., Suwon-si (KR)

(72) Inventors: Jonghyeuk Lee, Hwaseong-si (KR); Hyuncheol Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 16/625,627

(22) PCT Filed: Jun. 18, 2018

(86) PCT No.: PCT/KR2018/006846
§ 371 (c)(1),
(2) Date: Dec. 20, 2019

(87) PCT Pub. No.: WO2018/236107
PCT Pub. Date: Dec. 27, 2018

(65) Prior Publication Data
US 2020/0187139 A1 Jun. 11, 2020

(30) Foreign Application Priority Data

Jun. 21, 2017 (KR) .................. 10-2017-0078627

(51) Int. Cl.
*H04W 56/00* (2009.01)
*H04W 74/08* (2009.01)

(52) U.S. Cl.
CPC ... *H04W 56/0005* (2013.01); *H04W 56/0035* (2013.01); *H04W 74/0833* (2013.01); *H04W 56/004* (2013.01)

(58) Field of Classification Search
CPC . H04W 74/0833; H04W 4/70; H04W 74/004; H04W 56/00; H04W 56/0005;
(Continued)

(56) References Cited

U.S. PATENT DOCUMENTS

| 2010/0296436 A1 | 11/2010 | Kwon et al. |
| 2012/0165004 A1 | 6/2012 | Zhang et al. |

(Continued)

FOREIGN PATENT DOCUMENTS

| KR | 10-2008-0000136 A | 1/2008 |
| WO | 2016190606 A1 | 12/2016 |
| WO | 2016195292 A1 | 12/2016 |

OTHER PUBLICATIONS

ISA/KR, International Search Report and Written Opinion of the International Searching Authority, International Application No. PCT/KR2018/006846, dated Sep. 20, 2018, 12 pages.
(Continued)

*Primary Examiner* — Jae Y Lee
*Assistant Examiner* — Aixa A Guadalupe Cruz

(57) ABSTRACT

The present disclosure relates to a 5G or pre-5G communication system for supporting a higher data rate, after a 4G communication system such as an LTE system. The present invention relates to a method for guaranteeing a quality of a service in a wireless communication system. Specifically, a method for a base station according to an embodiment of the present invention comprises the steps of: receiving a PRACH from a terminal; identifying a transmission pattern of the PRACH for a symbol group including a plurality of symbols transmitted in a single tone; acquiring information of phase difference between tones, in which the PRACH has been received, according to multiple intervals between symbol groups on the basis of the transmission pattern of the PRACH; estimating a phase offset on the basis of the information of phase difference; and generating uplink tim-
(Continued)

ing information for transmission to the terminal, by using a timing offset converted from the estimated phase offset.

15 Claims, 12 Drawing Sheets

(58) Field of Classification Search
CPC .... H04B 1/713; H04B 1/7143; H04B 1/7136; H04B 2201/71353; H04B 1/7156; H04L 27/2662; H04L 5/0012; H04L 1/1812; H04L 1/1822; H04L 1/1864; H04L 1/1896; H04L 5/00; H04J 11/0023
See application file for complete search history.

(56) References Cited

U.S. PATENT DOCUMENTS

| | | | |
|---|---|---|---|
| 2015/0181595 | A1 | 6/2015 | Li et al. |
| 2017/0094689 | A1 | 3/2017 | Lin et al. |
| 2017/0180001 | A1* | 6/2017 | Wang ............... H04W 74/002 |
| 2017/0202028 | A1* | 7/2017 | Gaal ............... H04W 72/0453 |
| 2017/0223743 | A1* | 8/2017 | Lin ............... H04L 27/2614 |
| 2017/0324587 | A1* | 11/2017 | Lin ............... H04L 27/2675 |
| 2018/0132280 | A1 | 5/2018 | Lee et al. |
| 2018/0152970 | A1 | 5/2018 | Lee et al. |
| 2018/0310341 | A1* | 10/2018 | Yerramalli ......... H04W 74/004 |
| 2019/0274168 | A1* | 9/2019 | Hwang ............ H04W 74/004 |

OTHER PUBLICATIONS

3GPP TS 25.214 V14.1.0 (Mar. 2017), Technical Specification, 3rd Generation Partnership Project; Technical Specification Group Radio Access Network; Physical layer procedures (FDD) (Release 14), Mar. 2017, 142 pages.

Lin, Xingqin, et al., "Random Access Preamble Design and Detection for 3GPP Narrowband IoT Systems," IEEE Wireless Communication Letters, May 2016, 5 pages.

Korean Intellectual Property Office, "Decision of Patent" dated Jul. 12, 2021, in connection with Korean Patent Application No. 10-2017-0078627, 7 pages.

* cited by examiner

METHOD FOR PERFORMING UPLINK SYNCHRONIZATION IN WIRELESS COMMUNICATION SYSTEM

CROSS-REFERENCE TO RELATED APPLICATIONS

This application is a 371 National Stage of International Application No. PCT/KR2018/006846, filed Jun. 18, 2018, which claims priority to Korean Patent Application No. 10-2017-0078627, filed Jun. 21, 2017, the disclosures of which are herein incorporated by reference in their entirety.

BACKGROUND

1. Field

The disclosure relates to a method for estimating a timing offset for acquiring uplink timing synchronization by using a phase offset estimated from a PRACH signal.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post-LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mmWave band and increase a propagation transmission distance. Further, in the 5G communication system, technologies, such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation, have been developed to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has evolved into an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, an intelligent Internet Technology (IT) service that collects and analyzes data generated from connected objects and creates new value in peoples' lives may be provided. The IoT may be applied to fields such as those of smart home, smart buildings, smart cities, smart cars, connected cars, smart grids, health care, smart home appliance, or high-tech medical services through the convergence of the conventional Information Technology (IT) and various industries.

The internet of things (IoT), which has been recently mentioned as one of main services to be provided through the next generation mobile communication, gets the limelight as a driving force for sustainable growth among relevant communication service providers and manufacturers, and the current relevant market is rapidly growing. Therefore, 3GPP has approved to introduce narrow band internet of things (NB-IoT) as a cellular IoT technology in response to a low power wide area communication standard.

An NB-IoT system may be operated in a method in which a signal is transmitted using a single tone. Thus, in the NB-IoT system, if a device uses a single tone to transmit a signal (for example, RACH signal) for a random access to a base station, a method for synchronizing uplink timing with a terminal by a base station is required to be considered.

SUMMARY

The disclosure provides a method for estimating a timing offset from a phase offset estimated based on a transmission pattern of PRACH signals, each being transmitted in a single tone.

In view of the foregoing, a method for a base station according to an embodiment of the disclosure may include: receiving a PRACH from a terminal; identifying a transmission pattern of the PRACH, which is transmitted in a single tone, with respect to a symbol group including a plurality of symbols; acquiring information on a phase difference between tones, in which the PRACHs have been received, according to multiple group intervals between symbol groups, based on the PRACH transmission pattern; estimating a phase offset based on the phase difference information; and generating uplink timing information for transmission to the terminal, by using a timing offset converted from the estimated phase offset.

In addition, a base station according to an embodiment of the disclosure may include a communication unit configured to receive a PRACH from a terminal, and a control unit configured to identify a transmission pattern of the PRACH, which is transmitted in a single tone, with respect to a symbol group including a plurality of symbols, acquire information on a phase difference between tones, in which the PRACHs have been received, according to multiple group intervals between symbol groups, based on the PRACH transmission pattern, estimate a phase offset based on the phase difference information, and generate uplink timing information for transmission to the terminal, by using a timing offset converted from the estimated phase offset.

According to an embodiment of the disclosure, a phase offset is estimated based on a transmission pattern of PRACH signals, each being transmitted in a single tone, so that a phase offset estimation performance can be improved and more accurate uplink timing synchronization can be acquired.

DETAILED DESCRIPTION

Figure 1:
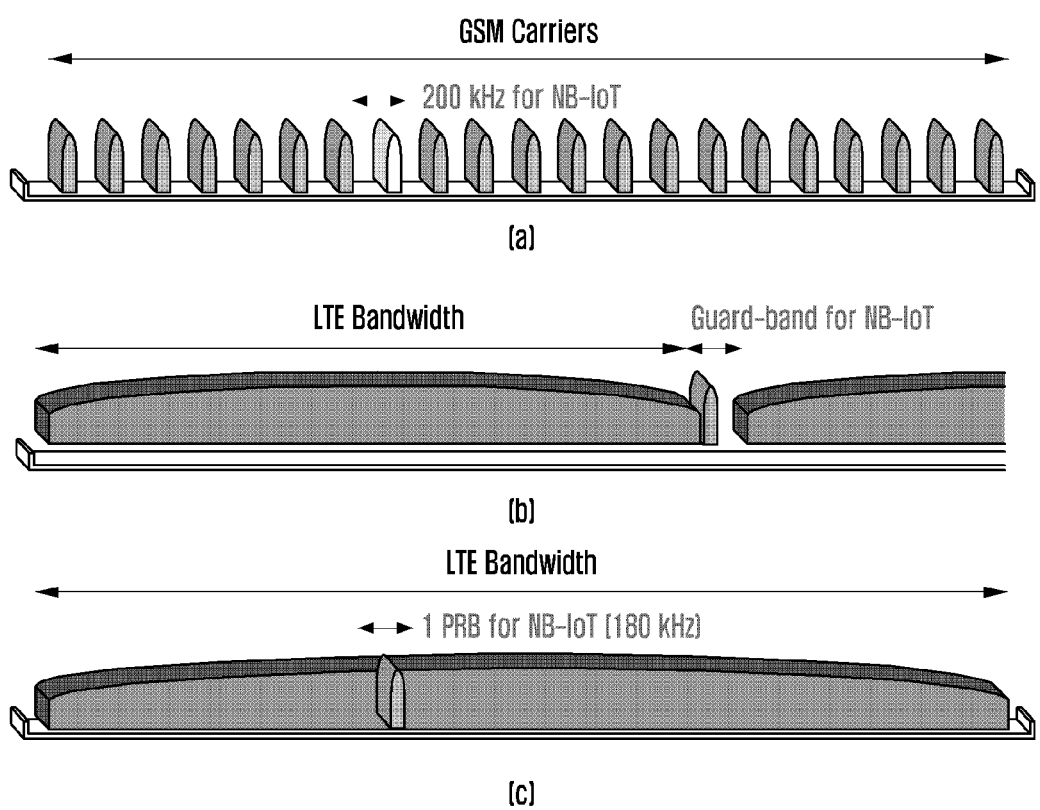
FIGS. 1A to 1C are diagrams representing various operation modes of a 3GPP NB-IoT system according to an embodiment of the disclosure.

In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

In addition, in describing the embodiments of the disclosure, a main substance of the disclosure may be applied to even other communication systems that have a similar technical background and channel shape, with a little change in a range that is not largely out of the range of the disclosure, and this may be possible by a determination of a person having a skilled technical knowledge in a technical field of the disclosure.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements or units, or divided into a larger number of elements or units. Moreover, the elements and "units" may be implemented to reproduce one or more CPUs within a device or a security multimedia card.

Hereinafter, referring to drawings attached to the specification, a method for synchronizing an uplink with a terminal by a base station according to an embodiment of the disclosure will be further described in detail.

As in a 3GPP NB-IoT system, if a terminal uses a single tone to transmit a signal (for example, PRACH signal) for accessing to a base station, the terminal may, for example, estimate a phase offset and convert the estimated phase offset into a timing offset in order to acquire uplink timing synchronization. Herein, for example, the phase offset may be estimated by using correlation between subcarriers in which signals are transmitted.

FIGS. 1A to 1C are diagrams representing various operation modes of a 3GPP NB-IoT system according to an embodiment of the disclosure.

A terminal according to an embodiment of the disclosure may use a single tone to transmit or receive a signal to or from a base station. For example, the transmission of the single tone may be performed in one of operation modes illustrated in FIGS. 1A to 1C.

As shown in FIG. 1A, an NB-IoT system according to an embodiment of the disclosure may be operated in a stand-alone mode (GSM Re-farming) which uses a GSM frequency band for a global system for mobile telecommunication (GSM) service and a potential frequency band for an IoT service to provide an NB-IoT service for itself. In this case, as illustrated in FIG. 1A, one carrier (about 200 kHz band) among GSM carriers may be used as a single tone.

In addition, as shown in FIG. 1B, an NB-IoT system according to an embodiment of the disclosure may be operated in a Guard-band mode (LTE Guard-band) which uses a resource block, which is defined in an LTE frequency band and is not used within a Guard-band to provide an NB-IoT service. In this case, the single tone illustrated in FIG. 1B may be used within the guard-band.

In addition, as shown in FIG. 1C, an NB-IoT system according to an embodiment of the disclosure may be operated in an In-band mode (LTE In-band) which uses a resource block within the LTE frequency band to provide an NB-IoT service. In this case, as illustrated in FIG. 1C, one physical resource block (PRB) within the LTE frequency band may be used as a single tone (180 kHz).

Figure 2:
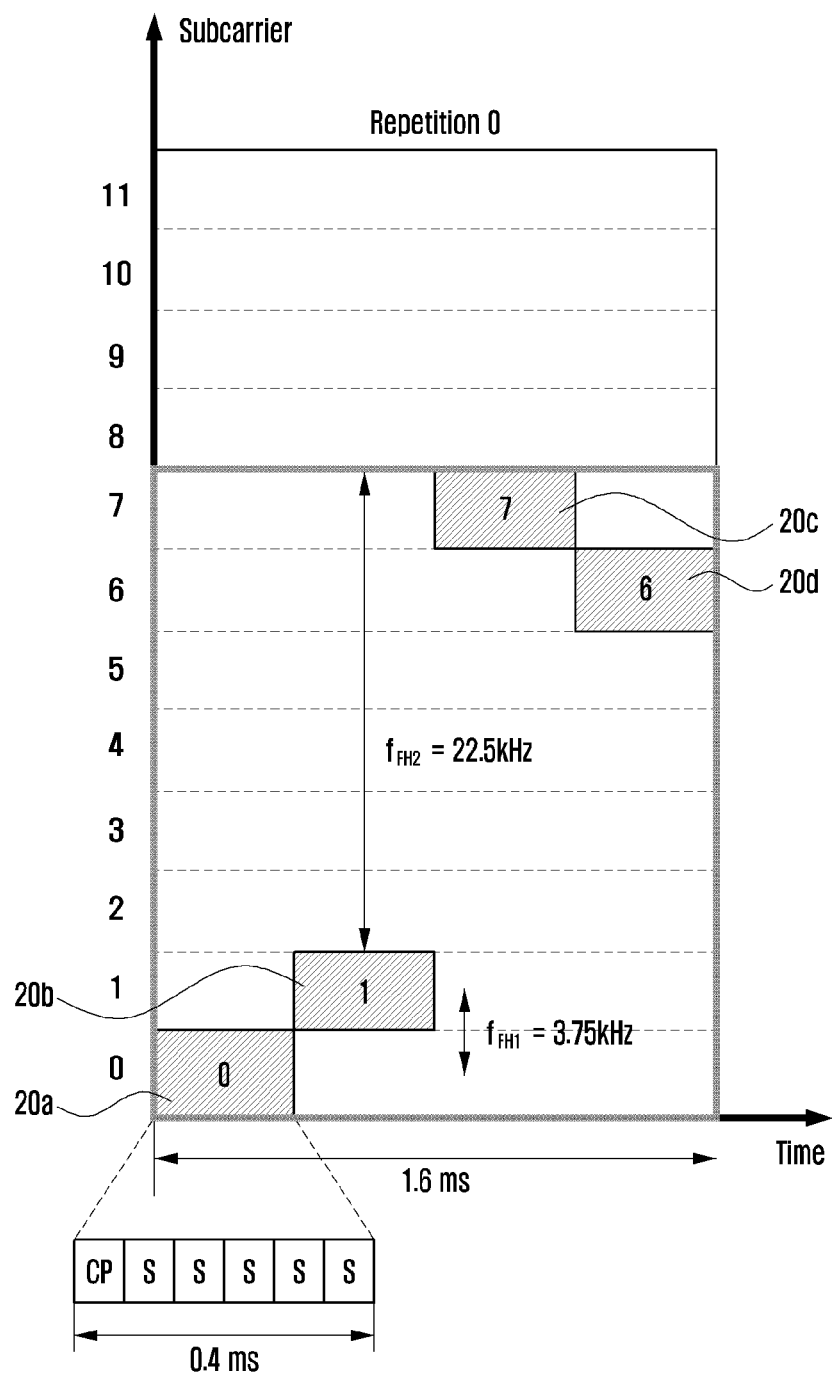
FIG. 2 is a diagram illustrating an example of transmitting a PRACH signal by using a single tone in a wireless communication system according to an embodiment of the disclosure.

FIG. 2 is a diagram illustrating an example of transmitting a PRACH signal by using a single tone in a wireless communication system according to an embodiment of the disclosure.

FIG. 2 illustrates one block including twelve subcarriers and time areas corresponding to the subcarriers. For example, a single tone according to an embodiment of the disclosure may correspond to each of the subcarriers illustrated in FIG. 2. In other words, the one block illustrated in FIG. 2 may include twelve tones according to an embodiment of the disclosure. For example, one subcarrier interval ($f_{FH1}$) may be about 3.75 kHz.

In a system according to an embodiment of the disclosure, a signal transmitted or received between a base station and a terminal may be transmitted in a single tone and a predetermined time area corresponding to the single tone. For example, as illustrated in FIG. 2, the predetermined time area may be understood as a section corresponding to a symbol group including a plurality of symbols and a cyclic prefix (CP). Hereinafter, according to an embodiment of the disclosure, a time area corresponding to a single tone to which a signal is allocated will be described using a term "symbol group".

For example, a PRACH signal according to an embodiment of the disclosure may be transmitted based on a plurality of repetition sections during a transmission time for transmitting the PRACH signal. One PRACH signal transmission section may include up to 128 repetition sections. In addition, one repetition section may be constituted by four symbol groups and twelve tones. For example, as illustrated in FIG. 2, one symbol group may be a time area corresponding to about 0.4 ms, and one repetition section may have a time area corresponding to four symbol groups (1.6 ms).

In addition, each of the plurality of repetition sections for allowing a PRACH signal to be transmitted may be previously configured as a PRACH transmission pattern corresponding to a specific terminal. That is, if a PRACH signal according to an embodiment of the disclosure is transmitted to a specific terminal, the PRACH signal may be transmitted according to a repetition section preconfigured corresponding to the specific terminal. In other words, the PRACH transmission pattern may indicate a pattern of a position of a tone to which the PRACH signal is allocated corresponding to each of a plurality of symbol groups included in each of the plurality of repetition sections.

For example, a PRACH transmission pattern of a first repetition section (repetition 0) illustrated in FIG. 2 may be a pattern in which a PRACH signal 20a is allocated to be transmitted in a first symbol group and a tone of tone number zero (tone #0), a PRACH signal 20b is allocated to be transmitted in a second symbol group and a tone (tone #2) spaced one tone interval from the first symbol group, a PRACH signal 20C is allocated to be transmitted in a third symbol group and a tone (tone #7) spaced interval six tone intervals from the second symbol group, and a PRACH signal 20d is allocated to be transmitted in a fourth symbol group and a tone (tone #6) spaced one tone interval from the third symbol group.

As described above, if a PRACH signal is transmitted, a base station may perform correlation between adjacent symbol groups and estimate a phase offset. In addition, the base station according to an embodiment of the disclosure may covert the estimated phase offset into a timing offset and acquire uplink synchronization. In this case, if PRACH signals are received through respective antennas, the base station may estimate a phase offset after combining the signals received from the antennas.

More specifically, the base station may obtain a correlation value between adjacent symbol groups by using equation 1 below and convert a phase offset estimated thereby into a timing offset by using equation 2 below.

$$R(k) = \sum_{a=0}^{A-1} \frac{R_a(k)}{\sigma_{n,a}^2}$$ [Equation 1]

In equation 1, a indicates an index of an antenna, and $R_a(k)$ indicates a correlation value between signals spaced k tone intervals from each other in an antenna a. For example, as shown in FIG. 2, if a PRACH is transmitted, $R_a(k)$ may include a correlation value between PRACH signals corresponding to tone #1 and tone #2, respectively, and a correlation value between PRACH signals corresponding to tone #7 and tone #6, respectively.

$$\text{Time\_offset}(k) = \frac{\text{angle}(R(k))}{\text{Subcarrier\_space} \times 2 \times \pi}$$ [Equation 2]

In equation 2, angle(R(k)) may indicate a radian value with respect to a phase angle of the correlation value obtained by equation 1. That is, the base station according to an embodiment of the disclosure may obtain a timing offset by using equation 2 in order to acquire uplink synchronization from a phase offset.

Figure 3:
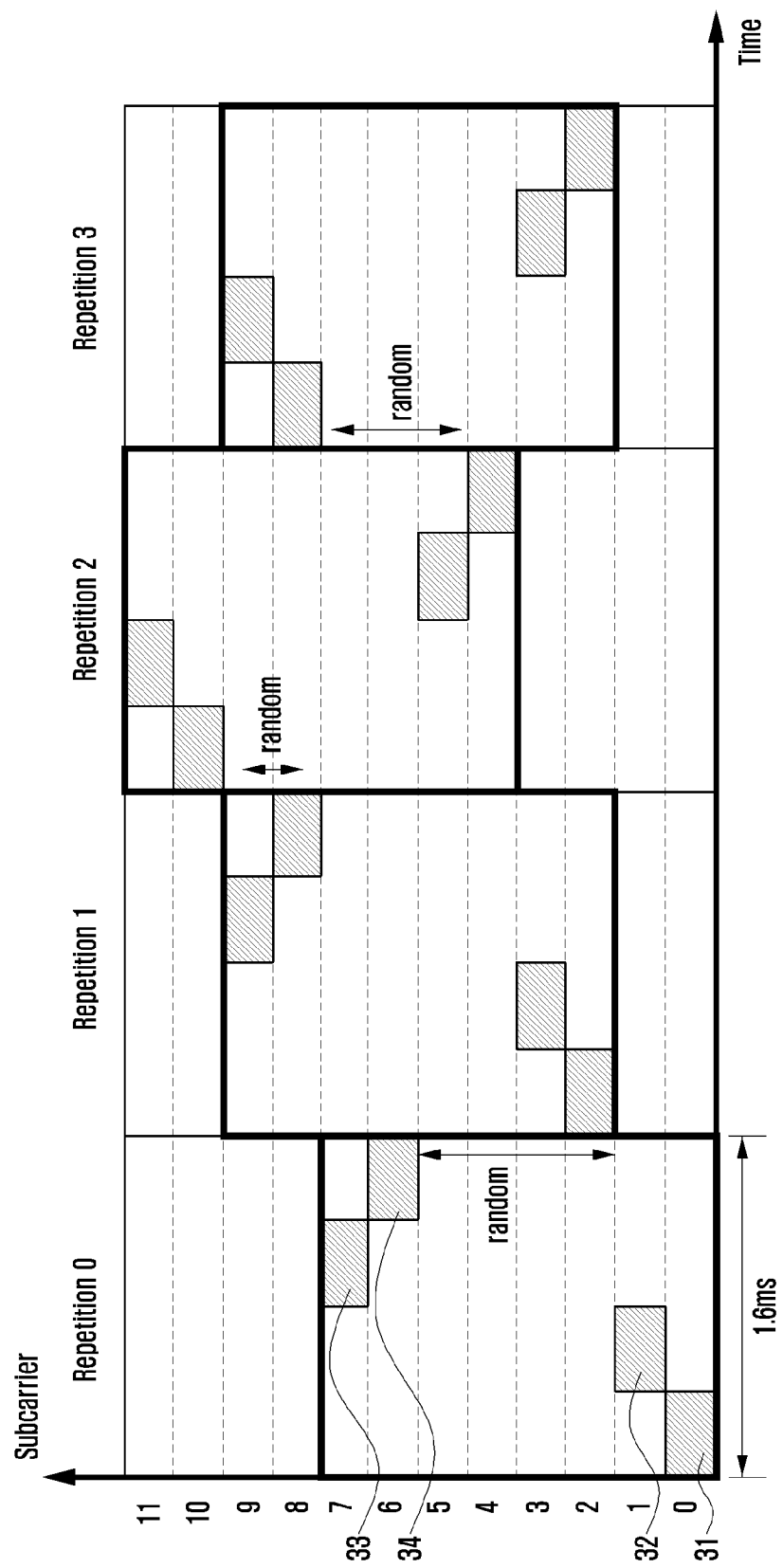
FIG. 3 is a diagram illustrating an example of a PRACH transmission pattern according to an embodiment of the disclosure.

FIG. 3 is a diagram illustrating an example of a PRACH transmission pattern according to an embodiment of the disclosure.

As illustrated in FIG. 2, a PRACH signal may be transmitted based on a PRACH transmission pattern preconfigured corresponding to a single terminal, and the PRACH transmission pattern may include the plurality of repetition sections. FIG. 3 illustrates a first repetition section (repetition 0) to a fourth repetition section (repetition 3) which are included in the PRACH transmission pattern.

As illustrated in FIG. 2, in the PRACH transmission pattern, a pattern of a position of a tone, in which a PRACH signal is transmitted, in each of symbol groups included within one repetition section may be preconfigured. A pattern of a position of a tone, in which a PRACH signal is transmitted, between adjacent symbol groups between repetition sections may be randomly determined.

For example, as shown in FIG. 3, a tone interval between PRACH signals, which are allocated to be transmitted in a fourth symbol group of the first repetition section (repetition 0) and to be transmitted in a first symbol group of the second repetition section (repetition 1), respectively, may be randomly determined.

Further, correlation for estimating a phase offset according to an embodiment of the disclosure may be performed based on an interval between symbol groups. In other words, the correlation according to an embodiment of the disclosure may be performed between PRACH signals corresponding to two symbol groups, respectively, which are selected with reference to a predetermined symbol group interval. For example, an interval between symbol groups, for performing correlation, may be determined with reference to one repetition section.

For example, in one repetition section, PRACH signals having one symbol group interval may be selected. Referring to the first repetition section (repetition 0) of FIG. 3, the base station according to an embodiment of the disclosure may select a first symbol group 31 and a second symbol group 32, the second symbol group 32 and a third symbol group 33, and the third symbol group 33 and a fourth symbol group 34.

In addition, in the first repetition section (repetition 0), the base station according to an embodiment of the disclosure may select the first symbol group 31 and the third symbol group 33, and the second symbol group 32 and the fourth symbol group 34, which have two symbol group intervals.

Further, in the first repetition section (repetition 0), the base station according to an embodiment of the disclosure may select the first symbol group 31 and the fourth symbol group 34, which have three symbol group intervals.

In an NB-IoT system according to an embodiment of the disclosure, if a timing offset is estimated, according to the existing method illustrated in FIG. 2, a phase offset may be estimated by using only a correlation value between PRACH signals having one symbol group interval. That is, there is a problem that a correlation value between PRACH signals having two or three symbol group intervals is not available for phase offset estimation, so that there is a limitation that a more appropriate timing offset value cannot be obtained. Hereinafter, a method for using correlation values of PRACH signals, based on a plurality of symbol group intervals will be described.

Figure 4:
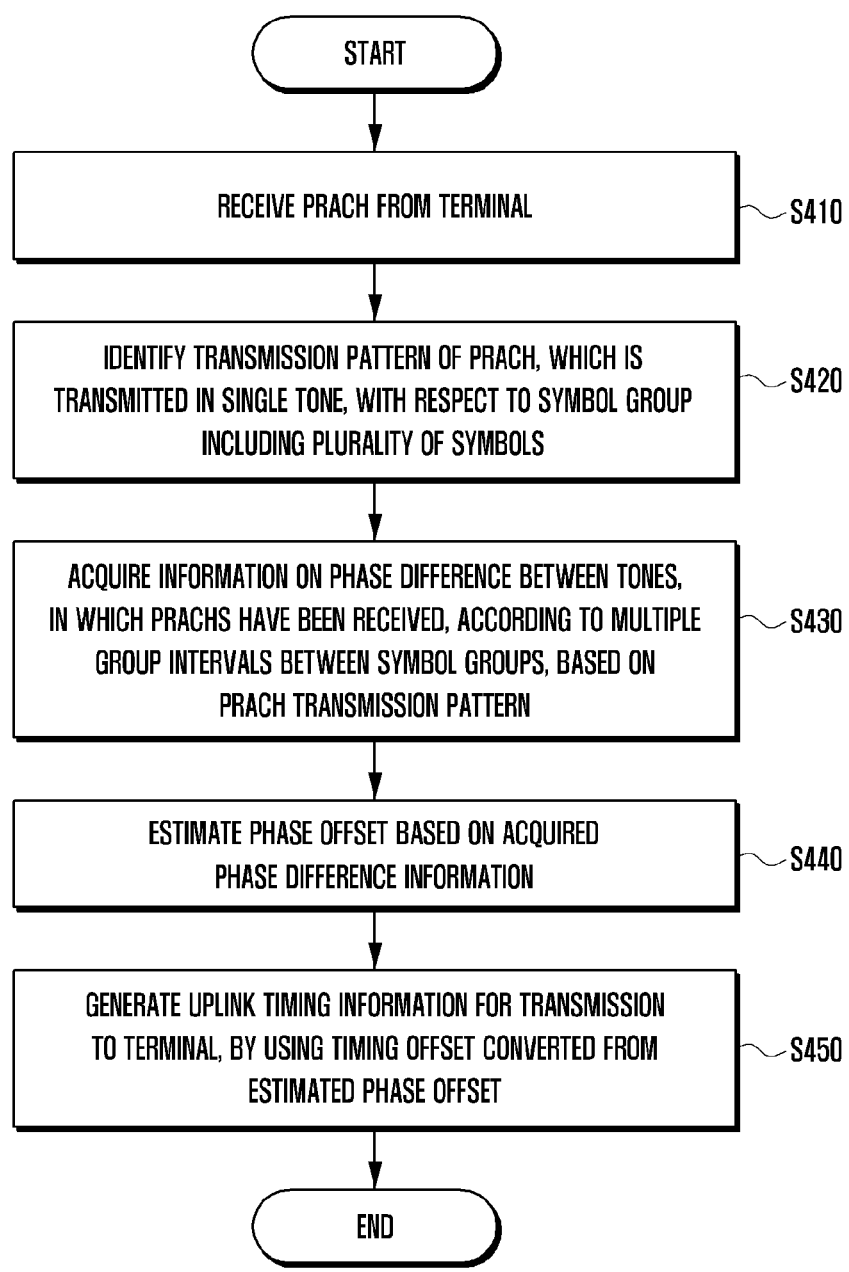
FIG. 4 is a flowchart representing a timing offset estimation method according to an embodiment of the disclosure.

FIG. 4 is a flowchart representing a timing offset estimation method according to an embodiment of the disclosure.

Referring to FIG. 4, a base station according to an embodiment of the disclosure may receive a PRACH from a terminal (S410).

As illustrated in FIG. 3, a terminal according to an embodiment of the disclosure may transmit a PRACH according to a transmission pattern preconfigured corresponding to the terminal. That is, a PRACH according to an embodiment of the disclosure may be transmitted according to a transmission pattern including a plurality of repetition sections, and one repetition section may include a plurality of symbol groups. Further, in one repetition section, a PRACH may be transmitted in one symbol group and a position of a tone preconfigured corresponding to the one symbol group.

Therefore, if a PRACH signal is received, the base station according to an embodiment of the disclosure may identify a transmission pattern of a PRACH, which is transmitted in a single tone, with respect to a symbol group including a plurality of symbols (S420).

For example, the base station according to an embodiment of the disclosure may identify a PRACH transmission pattern, such as the number of repetition sections in which PRACHs are transmitted, the number of symbol groups included in each repetition section, and a position of a tone to which a PRACH is allocated corresponding to a symbol group. Further, the base station according to an embodiment of the disclosure may identify whether a PRACH to be transmitted from a terminal is transmitted according to a repetition pattern preconfigured corresponding to the terminal.

In addition, the base station according to an embodiment of the disclosure may acquire information on a phase difference between tones, in which PRACHs have been received, according to multiple group intervals between symbol groups, based on a PRACH transmission pattern (S430).

Figure 5A:
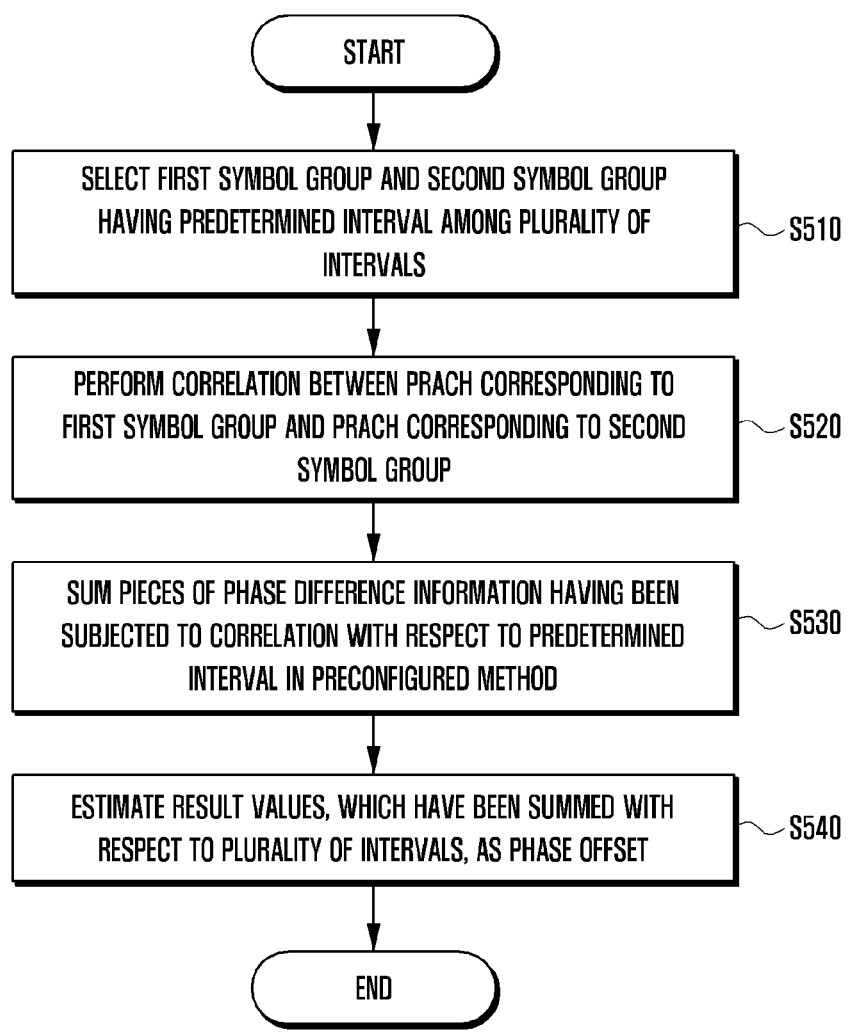
FIG. 5A is a flowchart representing a method for estimating a phase offset according to an embodiment of the disclosure.
Figure 5B:
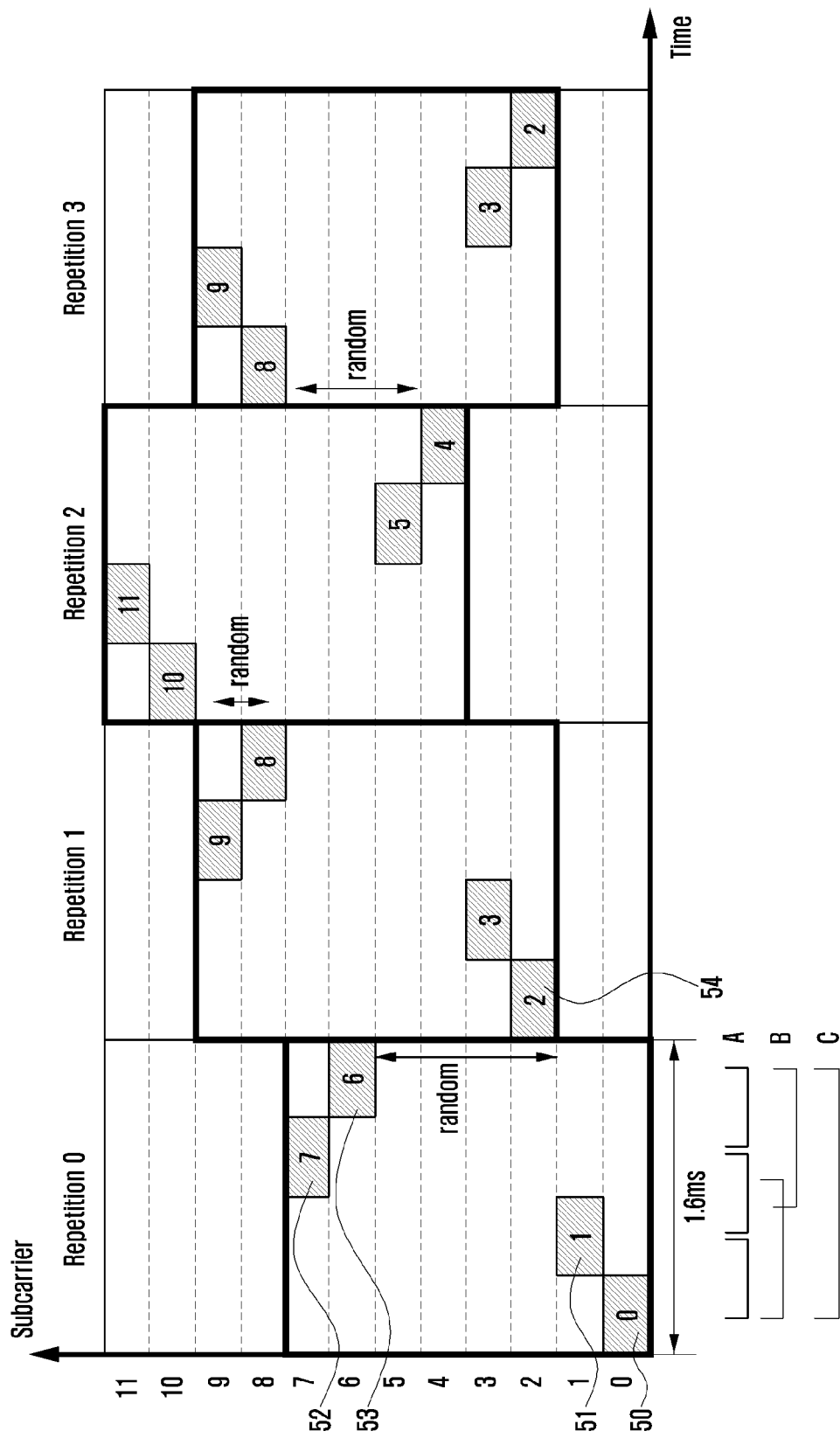
FIG. 5B is a diagram illustrating an example of a PRACH transmission pattern, for explaining the phase offset estimation method according to FIG. 5A.
Figure 5C:
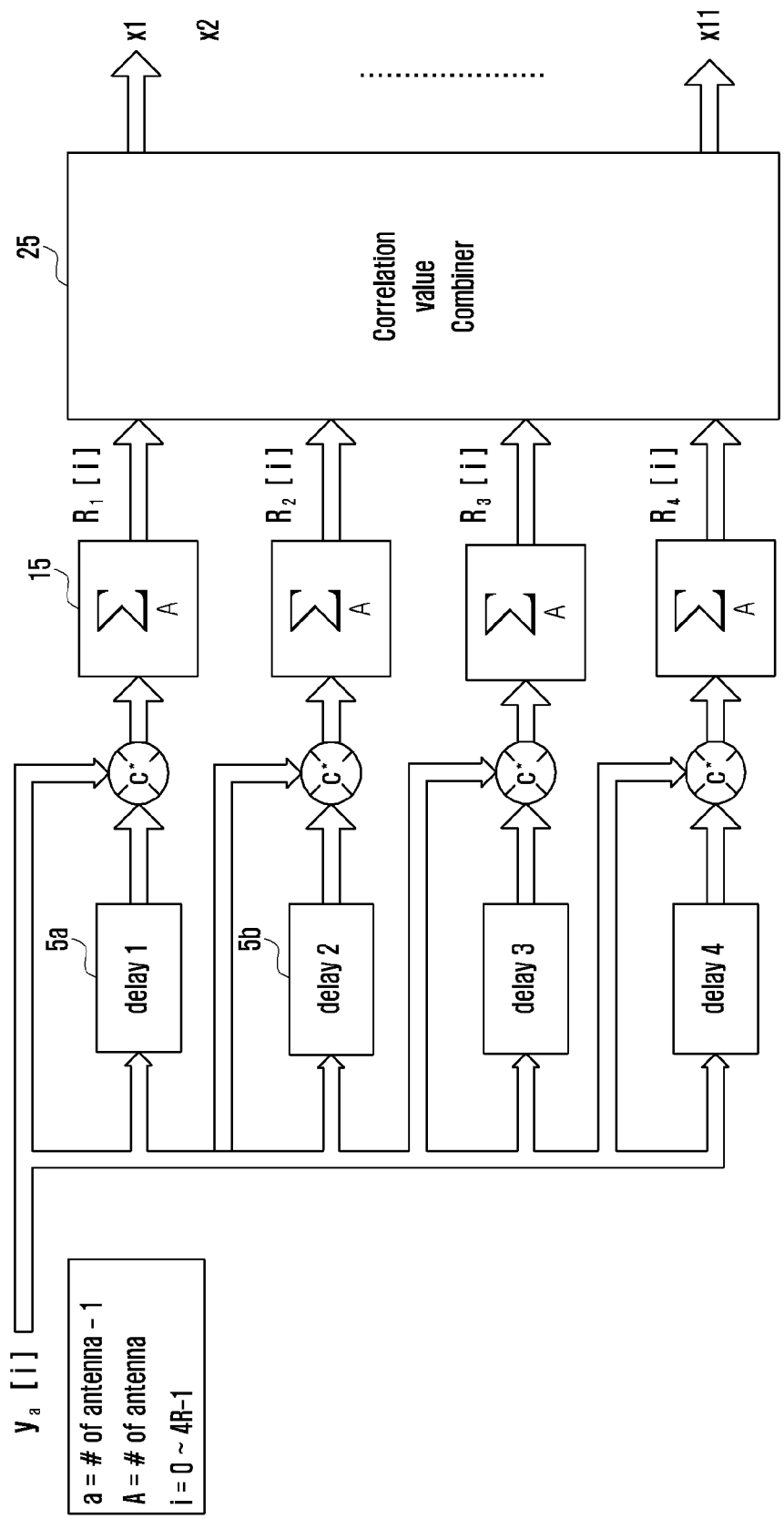
FIG. 5C is a diagram illustrating the method for estimating a phase offset based on phase difference information for each of a plurality of symbol group intervals.

Herein, the phase difference information may include information on a correlation value acquired from tones in which two PRACHs randomly selected based on a PRACH transmission pattern have been transmitted. More specifically, the phase difference information may determine a symbol group interval based on the PRACH transmission pattern and include a correlation result value having been subjected to correlation by using tone (frequency) information of each of the two PRACH signals having the determined symbol group interval. Referring to FIGS. 5A to 5C, a method for acquiring the phase difference information will be further described later in detail.

The base station according to an embodiment of the disclosure may determine a plurality of different symbol group intervals based on the PRACH transmission pattern and acquire the phase difference information with reference to each of the plurality of symbol group intervals.

Therefore, if the phase difference information is acquired, the base station according to an embodiment of the disclosure may estimate a phase offset based on the acquired phase difference information (S440). The base station according to an embodiment of the disclosure may generate uplink timing information for transmission to a terminal, by using a timing offset converted from the estimated phase offset (S450).

As described above, the base station according to an embodiment of the disclosure may acquire pieces of phase difference information with reference to each of the plurality of symbol group intervals, convert a phase offset estimated thereby, and thus acquire a timing offset for generation of uplink timing information. Therefore, in a method according to an embodiment of the disclosure, all correlation values between PRACH signals having various symbol group intervals may be used, so that an estimation performance of a phase offset can be improved and more accurate uplink timing information can be transmitted to a terminal.

FIG. 5A is a flowchart representing a method for estimating a phase offset according to an embodiment of the disclosure, and FIG. 5B is a diagram illustrating an example of a PRACH transmission pattern, for explaining the phase offset estimation method according to FIG. 5A. Further, FIG. 5C is a diagram illustrating the method for estimating a phase offset based on phase difference information for each of the plurality of symbol group intervals.

First, referring to FIG. 5A, the base station according to an embodiment of the disclosure may select one of the plurality of symbol group intervals for acquiring the phase difference information for each of the plurality of symbol group intervals. That is, the base station according to an embodiment of the disclosure may determine a predetermined symbol group interval among the plurality of symbol group intervals and select any first symbol group and any second symbol group having the determined symbol group interval (S510).

More specifically, reference will be made to FIG. 5B for the following description. For example, the base station according to an embodiment of the disclosure may select two symbol groups with reference to one symbol group interval (interval A).

For example, the base station may select a first symbol group 50 and a second symbol group 51, the second symbol group 51 and a third symbol group 52, and the third symbol group 52 and a fourth symbol group 53, which are included in a first repetition section (repetition 0). Further, the base station may select the fourth symbol group 53 of the first repetition section (repetition 0) and a first symbol group 54 of a second repetition section (repetition 1). As described above, the base station according to an embodiment of the disclosure may select a plurality of pairs of symbol groups having one symbol group interval from the entire PRACH transmission section (for example, in FIG. 5B, section from the first repetition section (repetition 0) to a fourth repetition section (repetition 3)).

Further, for example, the base station according to an embodiment of the disclosure may select two symbol groups with reference to two symbol group intervals (interval B).

For example, the base station may select the first symbol group 50 and the third symbol group 52, and the second symbol group 51 and the fourth symbol group 53, all the symbol groups being included in the first repetition section (repetition 0). In addition, the base station may select the third symbol group 52 of the first repetition section (repetition 0) and the first symbol group 54 of the second repetition section (repetition 1). As described above, the base station according to an embodiment of the disclosure may select a plurality of pairs of symbol groups having two symbol group intervals from the entire PRACH transmission section (for example, in FIG. 5B, section from the first repetition section (repetition 0) to the fourth repetition section (repetition 3)).

In addition, for example, the base station according to an embodiment of the disclosure may select two symbol groups with reference to three symbol group intervals (interval C).

For example, the base station may select the first symbol group 50 and the fourth symbol group 53, which are included in the first repetition section (repetition 0). In addition, the base station may select the second symbol group 51 of the first repetition section (repetition 0) and the first symbol group 54 of the second repetition section (repetition 1). As described above, the base station according to an embodiment of the disclosure may select a plurality of pairs of symbol groups having three symbol group intervals from the entire PRACH transmission section (for example, in FIG. 5B, section from the first repetition section (repetition 0) to the fourth repetition section (repetition 3)).

Referring to FIG. 5A, with reference to a predetermined symbol group interval, the base station according to an embodiment of the disclosure may select a first symbol group and a second symbol group, and perform correlation by using a PRACH corresponding to the first symbol group and a PRACH corresponding to the second symbol group (S520).

More specifically, the base station according to an embodiment of the disclosure may obtain a correlation value by using tone information of PRACHs corresponding to the first symbol group and the second symbol group, respectively, which are selected with reference to one symbol group interval. At this point, a plurality of pairs of the first symbol group and the second symbol group may be selected with reference to one symbol group interval, so that a plurality of correlation values with respect to one symbol group interval may be obtained.

The base station according to an embodiment of the disclosure may acquire the plurality of correlation values, which have been obtained with respect to one symbol group interval, as phase difference information with respect to the predetermined symbol group interval, and may acquire pieces of phase difference information for the plurality of symbol group intervals.

In addition, the base station according to an embodiment of the disclosure may sum pieces of phase difference information having been subjected to correlation with respect to the predetermined symbol group interval, in a preconfigured method (S530).

That is, the base station according to an embodiment of the disclosure may sum a plurality of correlation values, which have been obtained with respect to the predetermined symbol group interval, in a preconfigured method. A method for summing the plurality of correlation values will be described later, referring to FIGS. 6A and 6B.

The base station according to an embodiment of the disclosure may estimate result values, which have been summed with respect to the plurality of symbol group intervals in the preconfigured method, as a phase offset (S540).

As described above, the base station according to an embodiment of the disclosure estimates a phase offset based on correlation values obtained with reference to multiple group intervals between symbol groups in which PRACHs have been received, so as to improve an estimation performance.

Referring to FIG. 5C, the phase offset estimation method described above will be further illustrated.

The base station according to an embodiment of the disclosure may receive signals through a plurality of antennas. In this case, the base station according to an embodiment of the disclosure may sum (hereinafter, also referred to as "coherent combining") signals received in the same tone among signals received through the antennas before acquiring phase difference information. $y_a[i]$ may indicate a signal obtained by coherent combining signals received through an antenna a.

$$y_a[i] = \sum_{t=0}^{4} s_i(t)$$

In the equation above, i may indicate an index of a symbol group and t may indicate indices of symbols included in the symbol group of i. In an embodiment of the disclosure, a case, in which one symbol group includes five symbols, will be described.

As illustrated in FIG. 5C, the base station according to an embodiment of the disclosure may use a signal $y_a[i]$ obtained by coherent combining as an input signal. Further, the base station according to an embodiment of the disclosure may determine a predetermined symbol group interval d and select symbol groups having the symbol group interval d to perform correlation. For example, as illustrated in FIG. 5C, the input signal $y_a[i]$ may be input into a block 5a of delay 1 if the symbol group interval d is determined to be 1, and may be input into a block 5b of delay 2 if the symbol group interval d is determined to be 2.

In addition, the base station according to an embodiment of the disclosure may obtain a correlation value of signals input into delay blocks, respectively, by using an equation below.

$$R_d[i] = \sum_{a=0}^{A-1} y_a[i]^* y_a[i-d]$$

In the equation, $y_a[i]$ and $y_a[i-d]$ may indicate symbol groups having a symbol group interval d. For example, $y_a[i]$ may indicate a first symbol group received through an antenna a, and $y_a[i-d]$ may indicate a second symbol group received through the antenna a. The base station according to an embodiment of the disclosure may input a correlation value for each antenna, which has been obtained by using PRACHs having the symbol group interval d, into a summing block 15a. In addition, the base station according to an embodiment of the disclosure may acquire phase difference information $R_d[i]$ obtained by summing the correlation values of antennas with respect to the plurality of antennas by using the summing block 15a.

In the equation, $R_d[i]$ may indicate phase difference information with respect to the symbol group interval d. For example, referring to FIG. 5B, in the first repetition section (repetition 0), R1[1] may indicate a sum of a correlation value between a signal $y_a[1]$ of the first symbol group 50 and a signal $y_a[2]$ of the second symbol group 51, a correlation value between the signal $y_a[2]$ of the second symbol group 51 and a signal $y_a[3]$ of the third symbol group 52, and a correlation value between the signal $y_a[3]$ of the third symbol group 52 and a signal $y_a[4]$ of the fourth symbol group 53.

As described above, the base station according to an embodiment of the disclosure may acquire multiple pieces of phase difference information ($R_1[i]$, $R_2[i]$, $R_3[i]$, $R_4[i]$) with respect to each symbol group interval by using the signals received through the plurality of antennas, and may then input the multiple pieces of phase difference information ($R_1[i]$, $R_2[i]$, $R_3[i]$, $R_4[i]$) into a summer 25 (correlation value combiner) to sum the multiple pieces of phase difference information in a preconfigured method. Values output from the summer 25 may be estimated as a phase offset value according to an embodiment of the disclosure.

Hereinafter, referring to FIGS. 6A and 6B, the method for estimating a phase offset will be further described in detail.

Figure 6A:
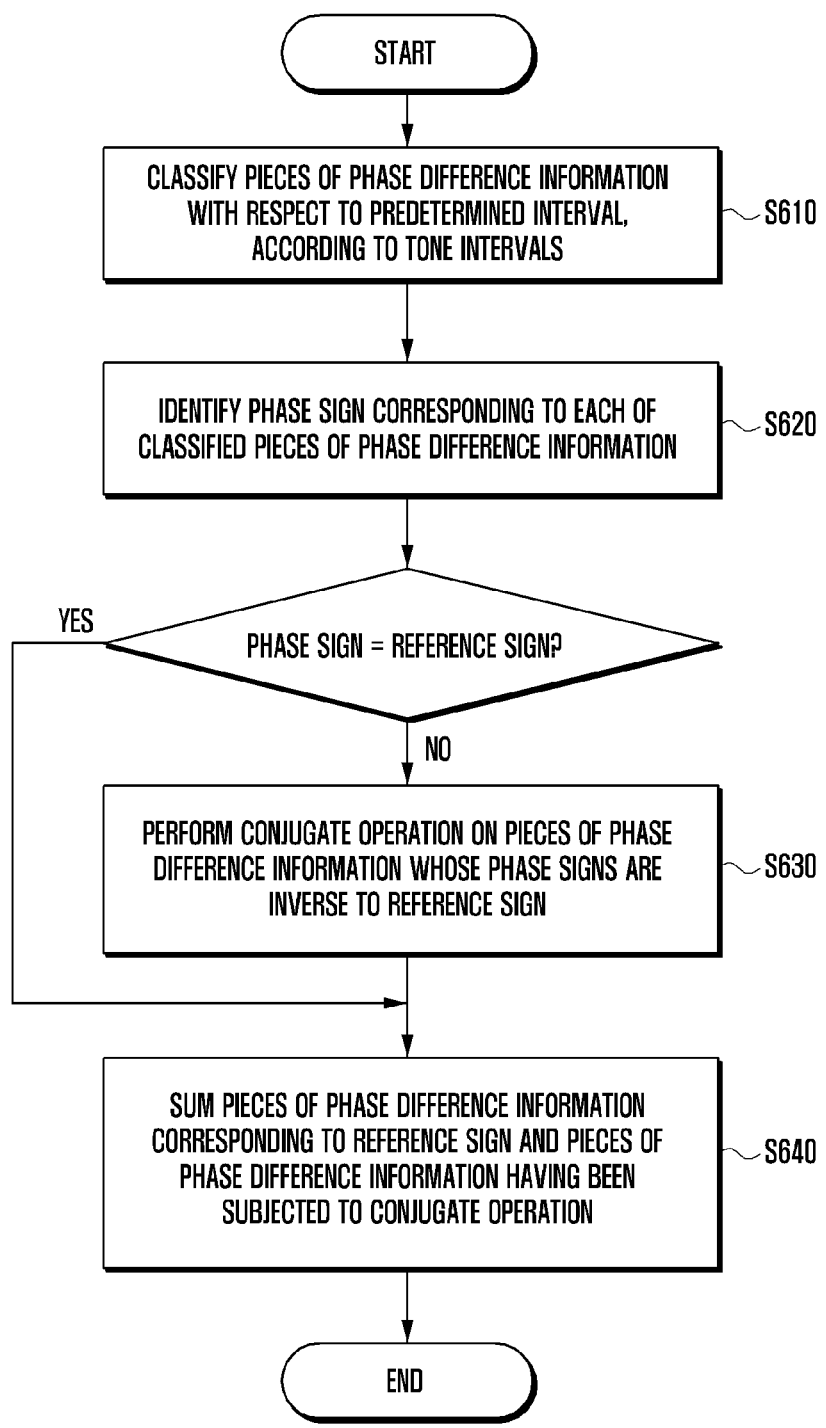
FIG. 6A is a flowchart describing the method for estimating a phase offset.
Figure 6B:
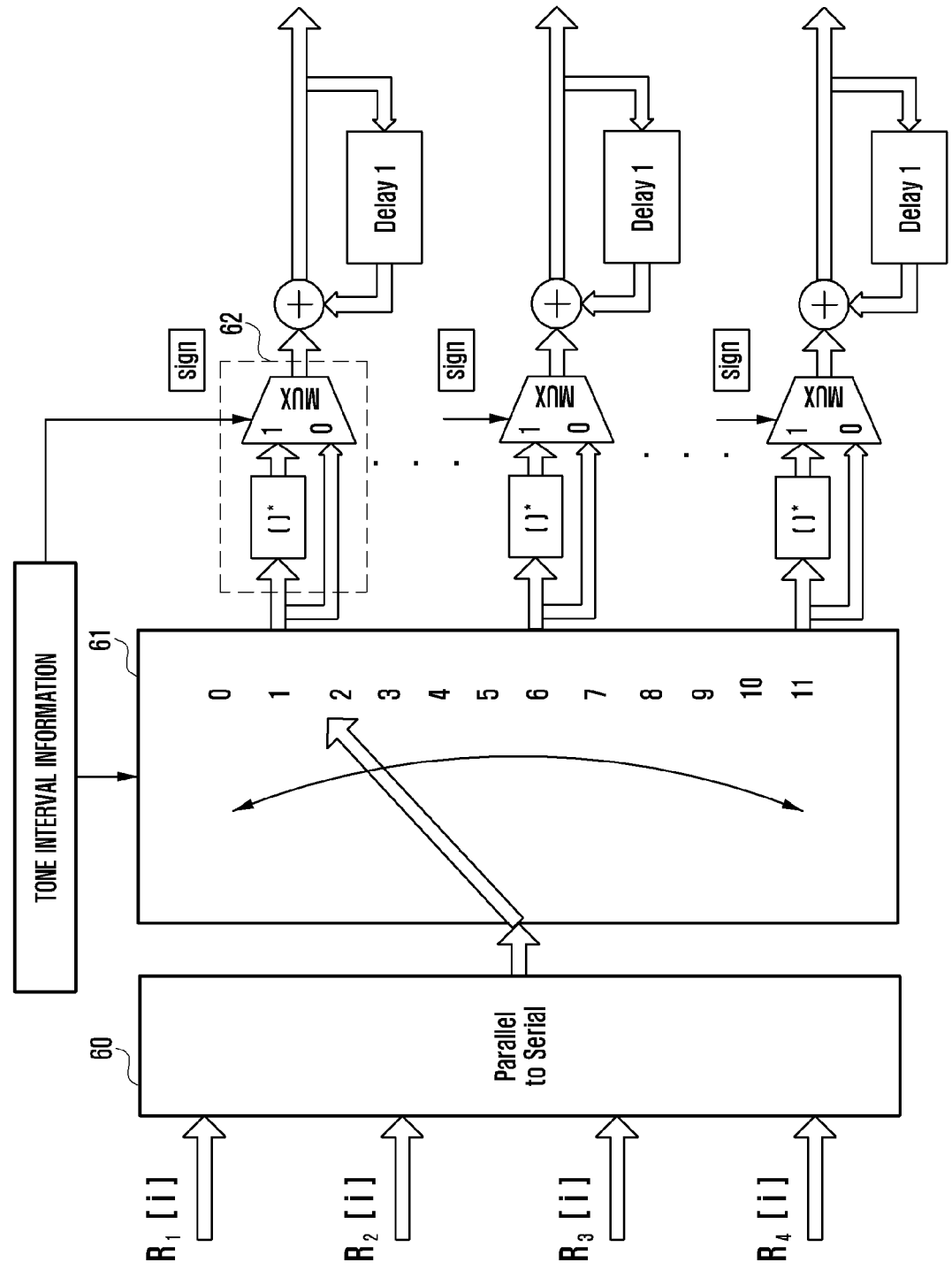
FIG. 6B is a diagram illustrating a method for summing pieces of phase difference information to estimate a phase offset.

FIG. 6A is a flowchart describing the method for estimating a phase offset, and FIG. 6B is a diagram illustrating a method for summing pieces of phase difference information to estimate a phase offset.

First, referring to FIG. 6A, the base station according to an embodiment of the disclosure may classify the multiple pieces of phase difference information, which have been acquired with respect to a predetermined symbol group interval, according to a tone interval corresponding to each of the multiple pieces of phase difference information (S610).

More specifically, as described above, a plurality of pairs of symbol groups selected based on one symbol group interval are within a PRACH transmission section and correlation values of the plurality of pairs of symbol groups may be acquired as the multiple pieces of phase difference information with respect to one symbol group interval. The base station according to an embodiment of the disclosure may classify the multiple pieces of phase difference information based on tone interval information of a pair of symbol groups used for generating the multiple pieces of phase difference information.

For example, the base station according to an embodiment of the disclosure may select a first symbol group and a second symbol group to generate phase difference information with respect to one symbol group interval, and acquire first phase difference information having been subjected to correlation between a PRACH corresponding to the first symbol group and a PRACH corresponding to the second symbol group. The base station according to an embodiment of the disclosure may select a third symbol group and a fourth symbol group which have one symbol group interval, and acquire second phase difference information having been subjected to correlation between a PRACH corresponding to the third symbol group and a PRACH corresponding to the fourth symbol group.

In addition, the base station according to an embodiment of the disclosure may classify the first phase difference information and the second phase difference information according to tone interval information. For example, the base station according to an embodiment of the disclosure may map tone interval information between tones, corresponding to the first symbol group and the second symbol group, respectively, to the first phase difference information. The base station according to an embodiment of the disclosure may map tone interval information between tones, corresponding to the third symbol group and the fourth symbol group, respectively, to the second phase difference information.

The tone interval information may include a size and phase sign information of a tone interval. For example, if a tone corresponding to the first symbol group is tone #0 and a tone corresponding to the second symbol group is tone #7, the tone interval information may have a size of seven tone intervals of a reference phase sign (for example, positive phase sign). In addition, if a tone corresponding to the third symbol group is tone #5 and a tone corresponding to the fourth symbol group is tone #2, the tone interval information may have a size of three tone intervals of an inverse phase sign (for example, negative phase sign) inverse to the reference.

As illustrated in FIG. 6B, the base station according to an embodiment of the disclosure may input the multiple pieces of phase difference information (for example, $R_1[i]$), which have been acquired with respect to one symbol group interval, into a serial block 60. In addition, the base station according to an embodiment of the disclosure may input each of the multiple pieces of phase difference information aligned in parallel to the serial block 60 into a classification block 61, and then classify each of the multiple pieces of phase difference information by mapping the multiple pieces of phase difference information to corresponding pieces of tone interval information, respectively, based on the tone interval information between symbol groups related to the multiple pieces of phase difference information, respectively.

At this point, the base station according to an embodiment of the disclosure may identify a phase sign corresponding to each of the multiple pieces of phase difference information, classified based on the tone interval information (S620).

Herein, as described above, the phase sign may be determined based on whether a direction of a tone interval is a positive direction or a negative direction with respect to a delay direction of a symbol group in which a PRACH has been transmitted.

The base station according to an embodiment of the disclosure sums the pieces of phase difference information, whose phase signs have been identified to be a reference sign, as they are, and performs a separate operation for the pieces of phase difference information, whose phase signs have been identified to be a sign inverse to the reference sign. That is, the base station according to an embodiment of the disclosure may perform a conjugate operation on the pieces of phase difference information corresponding to the inverse phase signs (S630).

As illustrated in FIG. 6B, the pieces of phase difference information corresponding to the inverse phase signs may be input into a complex operation block 62, and then summed while the conjugate operation has been performed.

In addition, the base station according to an embodiment of the disclosure may sum the pieces of phase difference information corresponding to the reference signs and the pieces of phase difference information having been subjected to the conjugate operation (S640).

In other words, the base station according to an embodiment of the disclosure may classify the pieces of phase difference information with respect to one symbol group interval and sum the classified pieces of phase difference information, based on the corresponding phase signs. If the pieces of phase difference information are summed with respect to each of the plurality of symbol group intervals in this method, the base station according to an embodiment of the disclosure may estimate summed result values as a phase offset.

Hereinafter, referring to FIGS. 7 and 8, according to an embodiment of the disclosure, a method for generating a timing offset and uplink timing information from a phase offset will be described.

Figure 7:
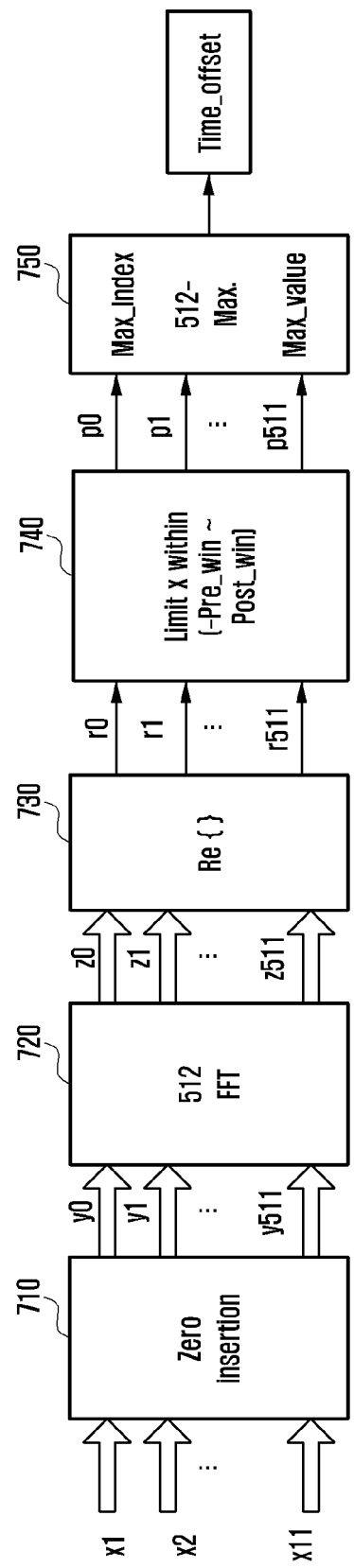
FIG. 7 is a block diagram illustrating a method for estimating a timing offset from the phase offset acquired according to an embodiment of the disclosure.
Figure 8:
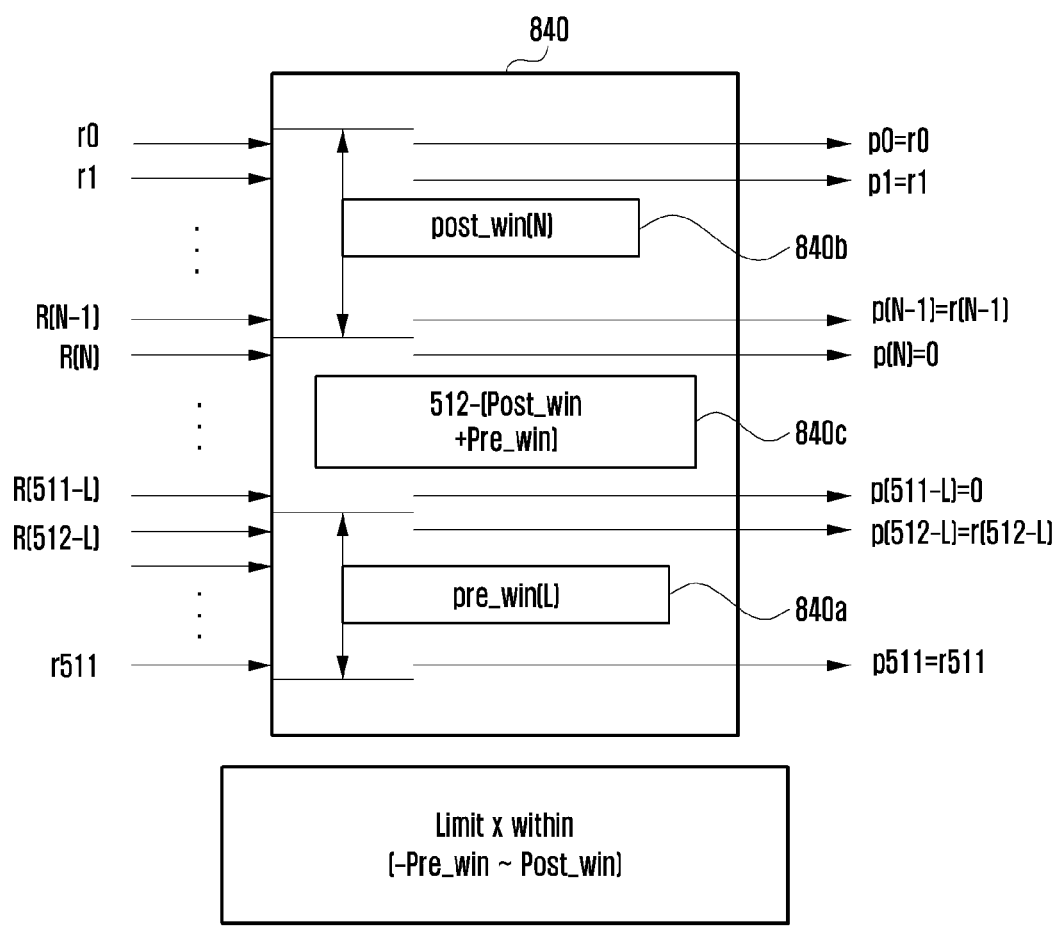
FIG. 8 is a diagram illustrating a window unit configured to determine a timing offset according to an embodiment of the disclosure, in detail.

FIG. 7 is a block diagram illustrating a method for estimating a timing offset from the phase offset acquired according to an embodiment of the disclosure, and FIG. 8 is a diagram illustrating a window unit configured to determine a timing offset according to an embodiment of the disclosure, in detail.

First, referring to FIG. 7, a plurality of phase offsets estimated according to the method described above may be transferred and input to a timing offset conversion block. For example, if a fast fourier transform (FFT) having a size of 512 is used for the timing offset conversion block, as illustrated in FIG. 7, eleven phase offset values may be input into a zero bit insertion unit 710. In the zero bit insertion unit 710, output terminals from 1 to 11 may output a plurality of phase offset values and output terminals from 12 to 512 may output a plurality of phase offset values by employing 0.

The values output from the zero bit insertion unit 710 may be input into a FFT 720. The FFT 720 may perform Fourier transform by using input phase offset values and 0, and output a result value through 512 output terminals. In addition, only values, which are real numbers among the values output from the FFT 720, may be output through a real number acquisition unit 730.

After that, the real numbers output from the real number acquisition unit 730 may be input into a window unit 740. The window unit 740 may acquire values within a predetermined window range among the values output from the real number acquisition unit 730 and the values which are not within the predetermined window range may be overwritten with 0.

More specifically, referring to FIG. 8, a window unit 840 may include ranges of a pre-window 840a, a post-window 840b, and a post+pre window 840c. The window unit 840 may overwrite the values input from the real number acquisition unit 730 with values which are not included in the window ranges by employing the window ranges according to a preconfigured condition.

After that, values which have been obtained based on the window ranges may be input into a timing offset determination unit 750. The timing offset determination unit 750 may determine a timing offset value by selecting the maximum value from among values input from the window unit 840.

The base station according to an embodiment of the disclosure may generate uplink timing information for uplink timing synchronization with a terminal, based on the timing offset value determined as described above. The base station according to an embodiment of the disclosure may transmit the generated uplink timing information to a terminal which has transmitted a PRACH.

Figure 9:
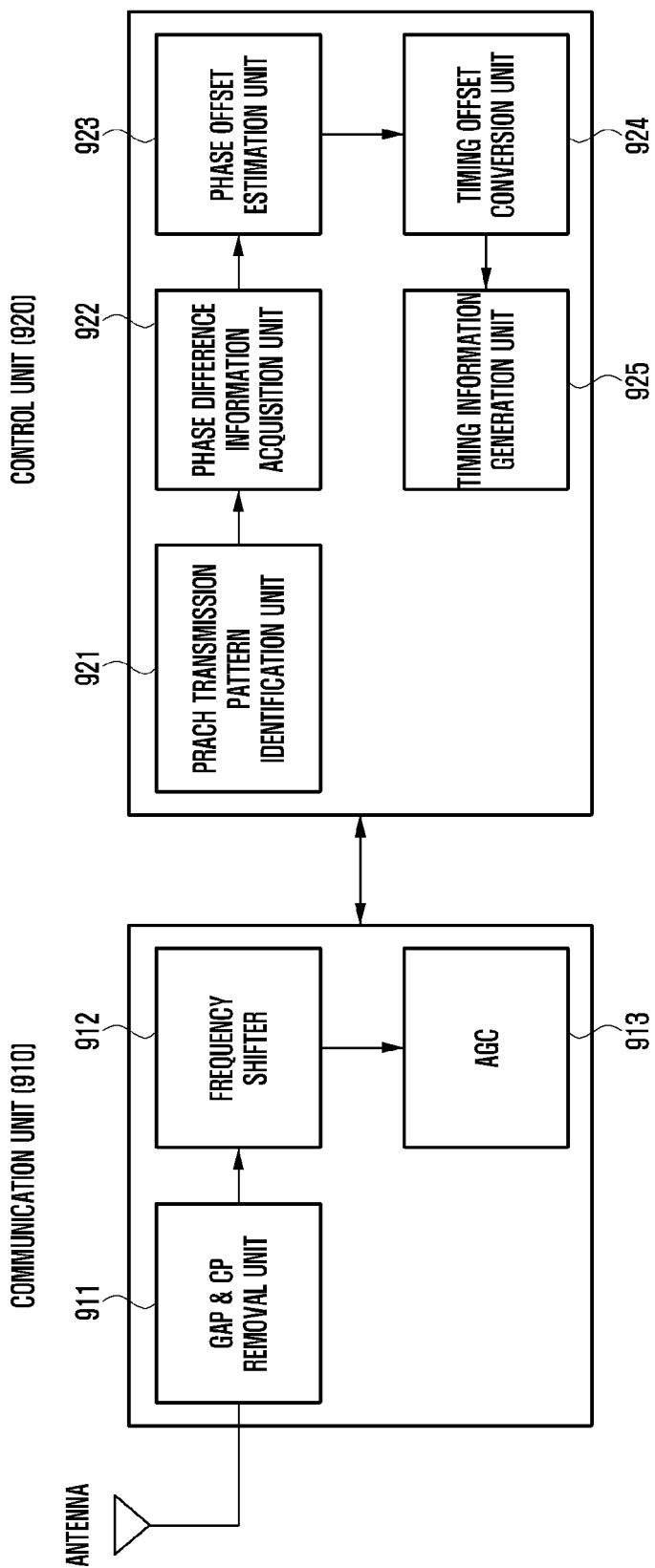
FIG. 9 is a block diagram illustrating a configuration of the base station according to an embodiment of the disclosure.

FIG. 9 is a block diagram illustrating a configuration of the base station according to an embodiment of the disclosure. Referring to FIG. 9, the action of the base station, described above, will be described.

As illustrated in FIG. 9, the base station according to an embodiment of the disclosure may include a communication unit 910 and a control unit 920.

The communication unit 910 according to an embodiment of the disclosure may include an antenna, a GAP&CP removal unit 911, a frequency shifter 912, and an adaptive gain controller (AGC) 913.

More specifically, if a signal is received through an antenna of the base station according to an embodiment of the disclosure, the GAP&CP removal unit 911 may remove a GAP and a cyclic prefix (CP) included in a PRACH signal. The signal, whose GAP and CP have been removed, is input into the frequency shifter 912 to be frequency shifted and is then input into the AGC 913 to be adjusted to be a signal included in a preconfigured bit area.

As described above, the signal, which has been preprocessed in the communication unit 910 may be input into the control unit 920 for timing offset estimation according to an embodiment of the disclosure. The control unit 920 according to an embodiment of the disclosure may include a PRACH transmission pattern identification unit 921, a phase difference information acquisition unit 922, a phase offset estimation unit 923, a timing offset estimation unit 924, and a timing information generation unit 925.

More specifically, the PRACH transmission pattern identification unit 921 may identify a transmission pattern of a PRACH which has been received from a terminal. That is, the PRACH transmission pattern identification unit 921 may identify a plurality of repetition sections of the PRACH and identify a PRACH transmission pattern from symbol groups included in respective repetition sections and information of tones corresponding to the respective symbol groups.

In addition, the phase difference information acquisition unit 922 may perform an action for acquiring phase difference information by using PRACH transmission pattern information which has been identified by the PRACH transmission pattern identification unit 921. More specifically, the phase difference information acquisition unit 922 may determine a symbol group interval for acquiring phase difference information, based on the identified PRACH transmission pattern. That is, the delay blocks 5a and 5b described in FIG. 5C may be included in the phase difference information acquisition unit 922. In addition, a pair of symbol groups having the determined symbol group interval may be selected and correlation may be performed by using PRACH signals corresponding to the selected pair of symbol groups. The phase difference information acquisition unit 922 may sum a plurality of correlation values, which have been acquired with respect to one symbol group interval, according to antennas. That is, the summing block 15 described above in FIG. 5C may be included in the phase difference information acquisition unit 922.

As described above, if a piece of phase difference information for each of the plurality of symbol group intervals is acquired by the phase difference information acquisition unit 922, the phase offset estimation unit 923 may estimate a phase offset. More specifically, the phase offset estimation unit 923 may arrange the pieces of phase difference information for the plurality of intervals through the serial block (refer to 60 of FIG. 6B), and then classify each of the pieces of phase difference information through the classification block (refer to 61 of FIG. 6B), based on the tone interval information between symbol groups corresponding to the pieces of phase difference information, respectively.

In addition, in the phase offset estimation unit 923, phase signs corresponding to the classified pieces of phase difference information may be identified and pieces of information, which is to be subjected to the conjugate operation, may be determined among the pieces of phase difference information. That is, the phase offset estimation unit 923 may perform the conjugate operation on phase difference signs having inverse values, by using the complex operation block (refer to 62 of FIG. 6B). After that, a phase offset may be estimated by summing pieces of phase difference information having reference phase signs and the pieces of phase difference information having been subjected to the conjugate operation.

The timing offset estimation unit 924 according to an embodiment of the disclosure may estimate the estimated phase offset as a timing offset by using the blocks described in FIG. 7. That is, the timing offset estimation unit 924 may insert a zero bit into a plurality of phase offset values, perform Fourier transform thereon and then select values included within a specific window range from among the values having been subjected to Fourier transform, by using a preconfigured window. In addition, the timing offset estimation unit 924 may estimate the maximum value among the values included within the specific window range as a timing offset.

The timing offset value estimated above may be generated as uplink timing information by the timing information generation unit 925 according to an embodiment of the disclosure and be then transmitted to a terminal through the communication unit 910.

Those skilled in the art can appreciate that it is possible to implement the disclosure in another specific form without changing the technical idea or the indispensable characteristics of the disclosure. Accordingly, it should be understood that the embodiments described above are merely exemplary and are not limited in all aspects. The scope of the disclosure is defined by the appended claims to be described later, rather than the detailed description. Accordingly, it should be appreciated that all modifications or variations derived from the meaning and scope of the appended claims and their equivalents are included in the range of the disclosure.

Although exemplary embodiments of the disclosure have been shown and described in this specification and the drawings and the specific terms have been used, they are used in general sense in order to easily explain technical contents of the disclosure, and to help comprehension of the disclosure, and are not intended to limit the scope of the disclosure. It is obvious to those skilled in the art to which the disclosure pertains that other modified embodiments on the basis of the technical idea of the disclosure besides the embodiments disclosed herein can be carried out.

The invention claimed is:

1. In a wireless communication system, a method for performing uplink synchronization by a base station, the method for the base station comprising:
    receiving physical random access channels (PRACHs) from a terminal;
    identifying a transmission pattern of the PRACHs, wherein the PRACHs are transmitted using single tones, with respect to a symbol group including a plurality of symbols;
    acquiring phase difference information for a time interval of a plurality of time intervals, in which the PRACHs have been received according to the transmission pattern of the PRACHs;
    estimating a phase offset based on a value on which a conjugate operation is performed or not according to a phase sign corresponding to the phase difference information; and
    generating uplink timing information for transmission to the terminal, by using a timing offset converted from the estimated phase offset,
    wherein the phase difference information for the time interval of the plurality of time intervals is acquired by summing correlation values of symbol group pairs having the time interval.

2. The method for the base station of claim 1, wherein the acquiring the phase difference information comprises:
    selecting a first symbol group and a second symbol group having a predetermined time interval among the plurality of time intervals;
    acquiring phase difference information with respect to the predetermined time interval from a correlation value between a PRACH corresponding to the first symbol group and a PRACH corresponding to the second symbol group; and
    acquiring pieces of phase difference information, corresponding to the plurality of time intervals, respectively.

3. The method for the base station of claim 2, wherein the estimating the phase offset comprises:
    summing the pieces of phase difference information with respect to the predetermined time interval in a preconfigured method; and
    estimating result values, which have been summed with respect to the plurality of time intervals, as the phase offset.

4. The method for the base station of claim 3, wherein the summing in the preconfigured method comprises:
    classifying the pieces of phase difference information with respect to the predetermined time interval, according to tone intervals; and
    summing the pieces of phase difference information, corresponding to the tone intervals, respectively.

5. The method for the base station of claim 4, wherein the summing the pieces of phase difference information comprises:
    identifying a phase sign corresponding to each of the classified pieces of phase difference information;

performing a conjugate operation on pieces of phase difference information whose phase signs are inverse to a reference sign; and summing pieces of phase difference information corresponding to the reference sign and the pieces of phase difference information having been subjected to the conjugate operation.

6. The method for the base station of claim 3, wherein the timing offset is obtained by converting a phase offset for each of the plurality of time intervals into a time domain.

7. The method for the base station of claim 6, the method comprising:

generating a value, which has been selected based on a preconfigured window from among values which have been converted into the time domain, as the uplink timing information; and transmitting the generated uplink timing information to the terminal.

8. The method for the base station of claim 1, wherein the transmission pattern of the PRACHs is identified based on a plurality of repetition sections, in which the PRACHs are transmitted, and wherein each of the repetition sections comprises a predetermined number of symbol groups.

9. A base station of a wireless communication system, the base station comprising:

a communication unit configured to receive physical random access channels (PRACHs) from a terminal; and a control unit configured to:

identify a transmission pattern of the PRACHs, wherein the PRACHs are transmitted using a single tone, with respect to a symbol group including a plurality of symbols, acquire phase difference information for a time interval of a plurality of time intervals, in which the PRACHs have been received according to the transmission pattern of the PRACHs, estimate a phase offset based on a value on which a conjugate operation is performed or not according to a phase sign corresponding to the phase difference information, and generate uplink timing information for transmission to the terminal, by using a timing offset converted from the estimated phase offset, wherein the phase difference information for the time interval of the plurality of time intervals is acquired by summing correlation values of symbol group pairs having the time interval.

10. The base station of claim 9, wherein the control unit is configured to acquire the phase difference information by: selecting a first symbol group and a second symbol group having a predetermined time interval among the plurality of time intervals; acquiring phase difference information with respect to the predetermined time interval from a correlation value between a PRACH corresponding to the first symbol group and a PRACH corresponding to the second symbol group; and then acquiring pieces of phase difference information corresponding to the plurality of time intervals, respectively.

11. The base station of claim 10, wherein the control unit is configured to sum the pieces of phase difference information with respect to the predetermined time interval in a preconfigured method and estimate result values, which have been summed with respect to the plurality of time intervals, as the phase offset.

12. The base station of claim 11, wherein the control unit is configured to classify the pieces of phase difference information with respect to the predetermined time interval, according to tone intervals and sum the pieces of phase difference information corresponding to the tone intervals, respectively.

13. The base station of claim 12, wherein the control unit is configured to identify a phase sign corresponding to each of the classified pieces of phase difference information, perform a conjugate operation on pieces of phase difference information whose phase signs are inverse to a reference sign, and sum pieces of phase difference information corresponding to the reference sign and the pieces of phase difference information having been subjected to the conjugate operation.

14. The base station of claim 11, wherein the control unit is configured to:

convert a phase offset for each of the plurality of time intervals into a time domain and thus obtain the timing offset;

generate a value, which has been selected based on a preconfigured window from among values which have been converted into the time domain, as the uplink timing information; and control the communication unit to transmit the generated uplink timing information to the terminal.

15. The base station of claim 9, wherein the control unit is configured to identify the transmission pattern of the PRACHs, based on a plurality of repetition sections in which the PRACHs are transmitted, and wherein each of the repetition sections comprises a predetermined number of symbol groups.

* * * * *